(12) United States Patent
Chen et al.

(10) Patent No.: US 6,903,599 B2
(45) Date of Patent: Jun. 7, 2005

(54) REGULATED CHARGE PUMP

(75) Inventors: Yin-Chang Chen, Hsin-Chu Hsien (TW); Ting-Kuo Yen, Miao- Li Hsien (TW)

(73) Assignee: AMIC Technology Corporation, Hsin-Chu (TW)

( * ) Notice: Subject to any disclaimer, the term of this patent is extended or adjusted under 35 U.S.C. 154(b) by 0 days.

(21) Appl. No.: 10/605,197

(22) Filed: Sep. 15, 2003

(65) Prior Publication Data

US 2004/0239408 A1 Dec. 2, 2004

(30) Foreign Application Priority Data

May 15, 2003 (TW) .................................... 92113209 A (51) Int. Cl.$^7$ .............................................. G05F 3/02
(52) U.S. Cl. ........................ 327/536; 327/537; 363/60
(58) Field of Search ................................ 327/536, 537; 363/59, 60

(56) References Cited

U.S. PATENT DOCUMENTS

| | | | | |
|---|---|---|---|---|
| 4,933,827 A | * | 6/1990 | Olivo et al. ................... | 363/60 |
| 5,039,877 A | * | 8/1991 | Chern ........................... | 327/536 |
| 5,258,662 A | * | 11/1993 | Skovmand .................. | 327/544 |
| 5,561,385 A | * | 10/1996 | Choi ............................. | 327/536 |
| 6,285,622 B1 | * | 9/2001 | Haraguchi et al. ........... | 327/536 |
| 6,373,323 B2 | * | 4/2002 | Kuroda ........................ | 327/536 |
| 6,429,725 B1 | * | 8/2002 | Tanzawa et al. ............. | 327/536 |
| 6,518,828 B2 | * | 2/2003 | Seo et al. .................... | 327/534 |

* cited by examiner

Primary Examiner—Terry D. Cunningham
(74) Attorney, Agent, or Firm—Winston Hsu (57) ABSTRACT

A regulated charge pump has a negative charge pump for generating a first output voltage according to an oscillation signal, and a regulator. The regulator has a level shift circuit, a differential amplifier for generating a compare signal, and an oscillator for generating the oscillation signal according to the compare signal. The level shift circuit has a plurality serially connected PMOS transistors. A first PMOS transistor has a first source connected to a first reference voltage, and a gate and a drain both connected to an output end of the level shift circuit. A second PMOS has a gate and a drain both connected to an output end of the negative charge pump.

18 Claims, 5 Drawing Sheets

REGULATED CHARGE PUMP

BACKGROUND OF INVENTION

1. Field of the Invention

The present invention relates to a regulated charge pump, and more particularly, to a regulated charge pump having a level shift circuit composed of a plurality of MOS transistors.

2. Description of the Prior Art

Since a voltage source fabricated in an integrated circuit needs a bulk of capacity, an integrated circuit can be provided with a charge pump, which is capable of transforming a (or a plurality of) first voltage into a second voltage of a predetermined level to provide voltages of a plurality of levels to reduce the bulk and cost.

Figure 1:
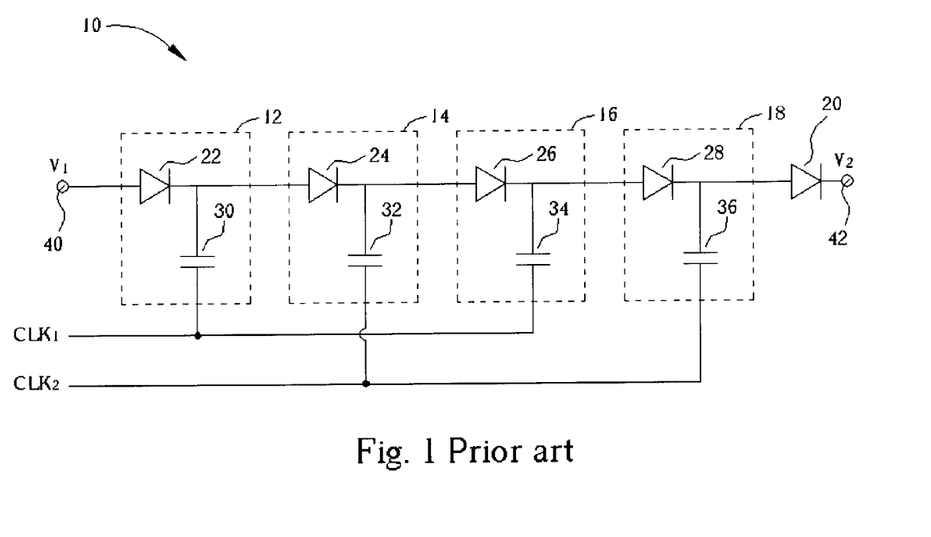
FIG. 1 is a circuit diagram of a charge pump according to the prior art.

Please refer to FIG. 1, which is a circuit diagram of a charge pump 10 according to the prior art. The charge pump 10 comprises a plurality of serially connected charging cells 12, 14, 16 and 18 and an isolation diode 20, each of the charging cells comprises a diode and a capacitor. The charge pump 10 further comprises an input end 40 connected to a first voltage $V_1$. Capacitors 30 and 34 are connected to a first clock $CLK_1$. A second clock $CLK_2$, complementary to the first clock $CLK_1$, is connected to capacitors 32 and 36. The first and second clocks $CLK_1$, $CLK_2$ both have a high level higher than the first voltage $V_1$.

Through the control function of the first and second clocks $CLK_1$ and $CLK_2$ by alternatively turning on and off the diodes 22, 24, 26 and 28 of the charging cells 12, 14, 16 and 18 respectively, a voltage at the output end 42 of the charge pump 10 in pumped higher and higher. Please refer to an equation 1 of a relation between the first and second voltage $V_1$ and $V_2$: $V_2 = V_1 + (V_1 - V_t) * N$ (Eq.1), where $V_t$ is a cutoff voltage of the diodes of the charging cells, and N is the number of charging cells in the charging pump 10.

It can be seen from Eq.1 that the charge pump 10 can adjust N and generate the second voltage $V_2$ of a predetermined level according to the first voltage $V_1$. Therefore, an integrated circuit comprising the charge pump 10 can use the first and second voltages $V_1$ and $V_2$ of different levels simultaneously.

The charge pump 10 is required to not only pull the first voltage $V_1$ up to the second voltage $V_2$ of a predetermined level, the charge pump 10 is also required to keep the second voltage $V_2$ at the predetermined level thereafter. Please refer to FIG. 2, which is a circuit diagram of a regulated charge pump 50 according to the prior art. The regulated charge pump 50 can not only pull the first voltage $V_1$ up to the second voltage $V_2$ of a predetermined level, the regulated charge pump 50 can also keep the second voltage $V_2$ at the predetermined level. The regulated charge pump 50 comprises a charge pump 52, an oscillator 54 connected to the charge pump 52, a differential amplifier 56 connected to the oscillator 54, and a level shift circuit 58 connected between the charge pump 52 and the differential amplifier 56. The level shift circuit 58 comprises a first input end 66 connected to a first reference voltage $V_{ref1}$ a second input end 68 connected to an output end 74 of the charge pump 52, an output end 64 connected to a negative input end 70 of the differential amplifier 56, a first resistor 60 connected between the first input end 66 and the output end 64, and a second resistor 62 connected between the output end 64 and the second input end 68. The differential amplifier 56 further comprises an output end 76 and a positive input end 72 connected to a second reference voltage $V_{ref2}$.

Figure 2:
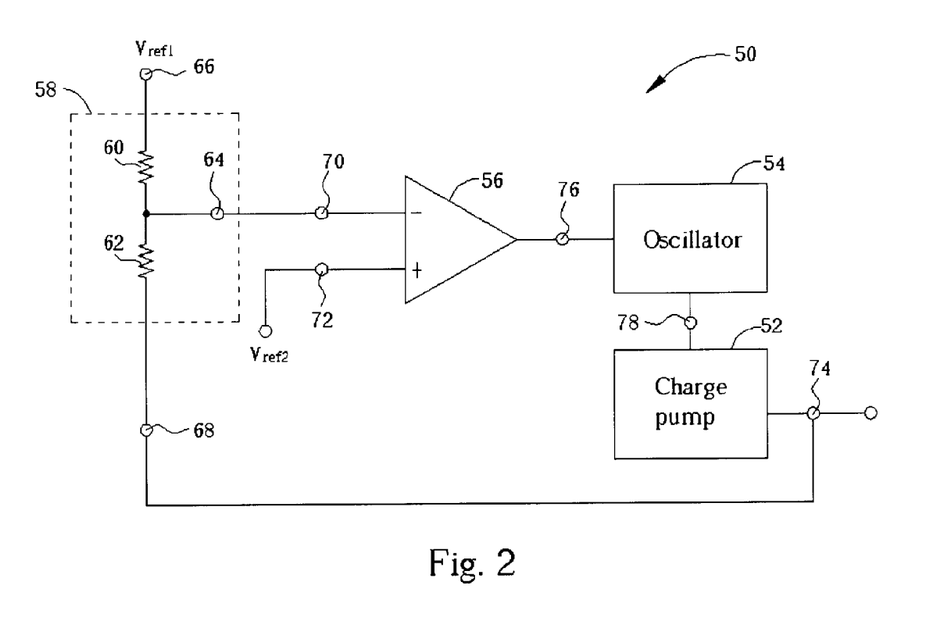
FIG. 2 is a circuit diagram of a first regulated charge pump according to the prior art.

The differential amplifier 56 outputs a compare signal at the output end 76 when a voltage at the negative input end 70 is lower than that at the positive input end 72. After receiving the compare signal, the oscillator 54 outputs an oscillation signal at an output end 78 of the oscillator 54. The charge pump 52 continues charging a voltage at the output end 74 only when the charge pump 52 receives the oscillation signal.

In the beginning of operation, a voltage at the output end 74 of the charge pump 52 keeps rising, and a voltage at the output end 64 of the level shift circuit 58 keeps rising accordingly. Since a voltage at the negative input end 70 (connected to the output end 64 of the level shift circuit 58) of the differential amplifier 56 is still lower than the second reference voltage $V_{ref2}$, the differential amplifier 56 continues to output the compare signal at the output end 76, the oscillator 54 outputs the oscillation signal at the output end 78 accordingly, and the charge pump 52 continues to pump a voltage at the output end 74. As the voltage at the output end 74 of the charge pump 52 is pumped up to a voltage enabling a voltage at the output end 64 of the level shift circuit 58 to be higher than the second reference voltage $V_{ref2}$, a voltage at the negative input end 70 of the differential amplifier 56 exceeds the second reference voltage $V_{ref2}$, which is applied to the positive input end 72 of the differential amplifier 56. The differential amplifier 56 at this moment stops outputting the compare signal, the oscillator 54 stops outputting the oscillation signal accordingly, and the charge pump 52 stops to pump the voltage at the output end 74 and keeps the voltage at the predetermined level.

The level shift circuit 58 of the regulated charge pump 50 is composed of a plurality of resistors 60 and 62. Too large a chip area is required to accommodate these resistors increasing the bulk of an integrated circuit comprising the prior art regulated charge pump 50.

SUMMARY OF INVENTION

It is therefore a primary objective of the claimed invention to provide a regulated charge pump, whose level shift circuit is composed of a plurality of MOS transistors, to overcome the problem that the prior art regulated charge pump requires a large area.

According to the claimed invention, the regulated charge pump comprises a negative charge pump for generating a first output voltage by determining an oscillation signal, and a regulator for restricting a swing of the first output voltage. The regulator comprises a level shift circuit connected to the negative charge pump for generating a second output voltage at an output end of the level shift circuit by determining the first output voltage generated by the negative charge pump, a differential amplifier whose first and second input ends are connected to a second reference voltage source and the output end of the level shift circuit respectively for generating a compare signal by determining a voltage difference between the second output voltage and a voltage generated by the second voltage source, and a voltage-controlled oscillator connected between an output end of the differential amplifier and an input end of the negative charge pump. The level shift circuit comprises a plurality of serially connected PMOS transistors, a first source of a first PMOS transistor of the PMOS transistors connected to a first reference voltage source, a first gate and a first drain of the first PMOS transistor connected to the output end of the level shift circuit, and a second gate and a second drain of a second PMOS transistor of the PMOS transistors connected to the output end of the negative charge pump.

The above-mentioned regulated charge pump is for generating a negative voltage. However, the negative charge pump and the level shift circuit composed of the plurality of PMOS transistors in the regulated charge pump can be substituted with a positive charge pump and a level shift circuit composed of a plurality of NMOS transistors instead respectively to provide a voltage of a level higher than zero.

It is an advantage of the claimed invention that a regulated charge pump having a level shift circuit composed of a plurality of MOS transistors, rather than resistors, reduces the area required on an integrated circuit.

These and other objectives of the claimed invention will no doubt become obvious to those of ordinary skill in the art after reading the following detailed description of the preferred embodiment that is illustrated in the various figures and drawings.

DETAILED DESCRIPTION

Figure 3:
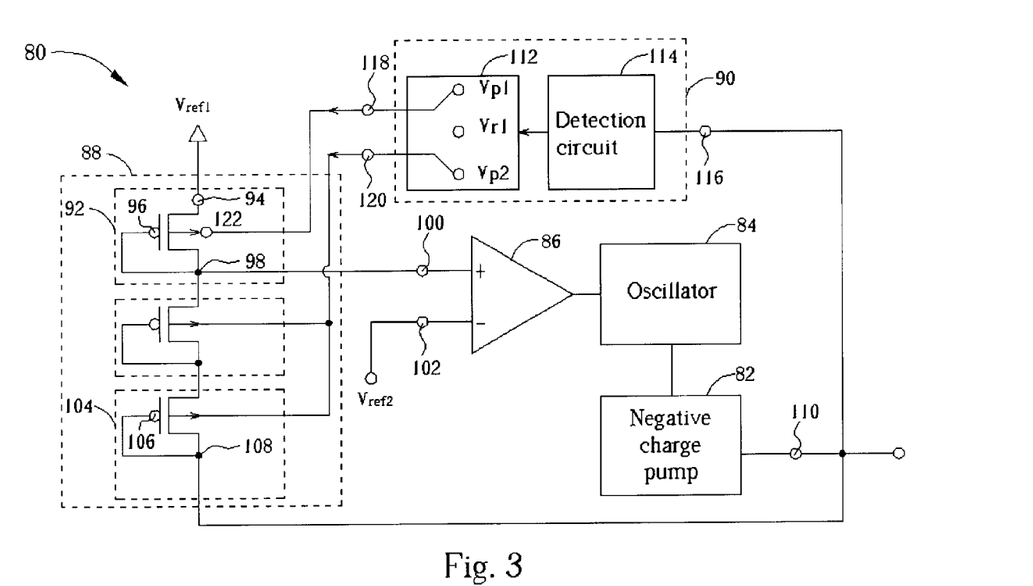
FIG. 3 is a circuit diagram of a regulated charge pump according to the present invention.

Please refer to FIG.3, which is a circuit diagram of a preferred embodiment of a regulated charge pump 80 according to the present invention. The regulated charge pump 80 comprises a negative charge pump 82 for generating a first output voltage by determining an oscillation signal, an oscillator 84, for example a voltage-controlled oscillator or similar device, connected to the negative charge pump 82 for generating the oscillation signal by determining a compare signal, a differential amplifier 86 connected to the oscillator 84, a level shift circuit 88 connected between the negative charge pump 82 and the differential amplifier 86, and a protection circuit 90. The level shift circuit 88 comprises a plurality of serially connected PMOS transistor. The protection circuit 90 comprises an input end 116 connected to an output end 110 of the negative charge pump 82, a first input end 118 connected to a first well 122 of a first PMOS transistor 92 of the level shift circuit 88, and a second input end 120 connected to wells of the renaming PMOS transistors of the level shift circuit 88.

In the level shift circuit 88, the first PMOS transistor 92 comprises a first source 94 connected to a first reference voltage $V_{ref1}$, a first gate 96 and a first drain 98, both of which are connected to a positive input end 100 of the differential amplifier 86. A second PMOS transistor 104 of the level shift circuit 88 has a second gate 106 and a second drain 108, both of which are connected to the output end 110 of the negative charge pump 82. The differential amplifier 86 further comprises a negative input end 102 connected to a second reference voltage $V_{ref2}$. In the preferred embodiment, the first reference $V_{ref1}$ is equal to 2 volts, while the second reference voltage $V_{ref2}$ is ground. The differential amplifier 86 is for generating the compare signal by determining a voltage difference between the positive and negative input ends 100 and 102.

The protection circuit 90 comprises a switch 112 and a detection circuit 114. The detection circuit 114 controls the switch 112 to connect the first output end 118 either to a first protection voltage $V_{p1}$ or to a first normal voltage $V_{r1}$ and to connect the second output end 120 either to a second protection voltage $V_{p2}$ or to the first normal voltage $V_{r1}$ by determining whether or not a voltage at the output end 110 of the negative charge pump 82 is lower than a first threshold voltage $V_{th1}$. That is, when a voltage at the output end 110 of the negative charge pump 82 is still higher than the first threshold voltage $V_{th1}$, the detection circuit 114 detects this and controls the switch 112 to connect both the first and second output ends 118 and 120 to the first normal voltage $V_{r1}$. On the contrary, when a voltage at the output end 110 of the negative charge pump 82 is lower than the first threshold voltage $V_{th1}$, the detection circuit 114 controls the switch 112 to connect the first and second output ends 118 and 120 to the first and second protection voltages $V_{p1}$ and $V_{p2}$ respectively. In the preferred embodiment, the first normal voltage $V_{r1}$, which is equal to five volts, is higher than the first protection voltage $V_{p1}$, which is equal to 2.9 volts and higher than the second protection voltage $V_{p2}$, which is equal to 1.8 volts. Why the three voltages $V_{p1}$, $V_{p2}$ and $V_{r1}$ are set as above is described as follows.

Figure 4:
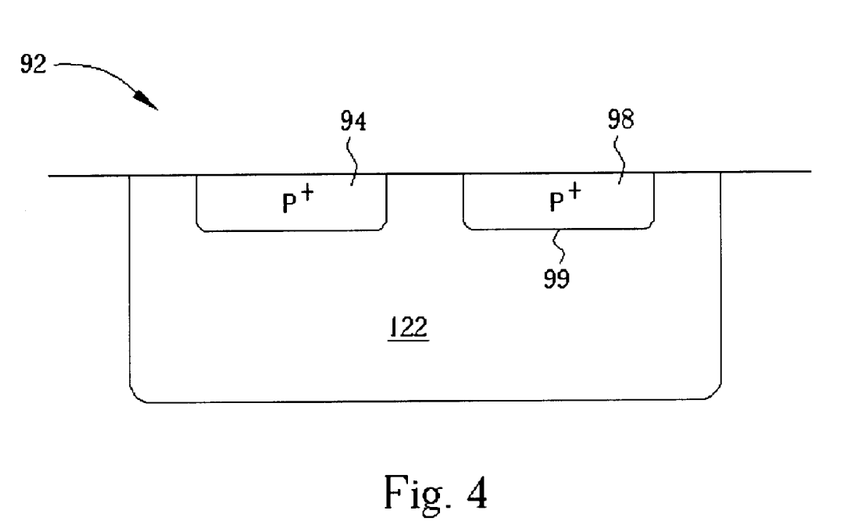
FIG. 4 is a cross-sectional diagram of a first PMOS transistor of a level shift circuit of the regulated charge pump shown in FIG. 3 according to the present invention.

Please refer to FIG. 4, which is a cross-sectional diagram of the first PMOS transistor 92 of the level shift circuit 88 of the regulated charge pump 80 according to the present invention. In order to guarantee that the first PMOS transistor 92 functions normally, a reverse bias voltage has to exist across the first drain 98 and the first well 122 of the first PMOS transistor 92. As a voltage at the first drain 98 of the first PMOS transistor 92 becomes lower, the reverse bias voltage becomes higher accordingly. For a PMOS transistor, when the PMOS transistor has a reverse bias voltage across a drain and a well higher than a predetermined voltage, usually equal to 12.5 13 volts, the PMOS transistor will have a junction breakdown between the drain and the well. In order to prevent a junction between a drain and a well of a PMOS transistor from breaking down, the protection circuit 90 of the regulated charge pump 80 reduces voltages at wells of each of the PMOS transistors of the level shift circuit 88 when a voltage at the output end 110 of the negative charge pump 82 is higher than the first threshold voltage $V_{th1}$, which is a voltage causing junctions between drains and wells of the PMOS transistor to breakdown. Since the first PMOS transistor 92 is located at a position farther than positions of the remaining PMOS transistors away from the output end 110 of the negative charge pump 82, a voltage at the first drain 98 of the first PMOS transistor 92 is higher than voltages at drains of the remaining PMOS transistors accordingly. That is, the reverse bias voltage across the first drain 98 and the first well 122 of the first PMOS transistor 92 is lower than reverse bias voltages respectively across drains and wells of the remaining PMOS transistors. Therefore, the first protection voltage $V_{p1}$, which is applied to the first well 122 of the first PMOS transistor 92 is slightly higher than the second protection voltage $V_{p2}$, which is applied to wells of the remaining PMOS transistors (when the switch 112 is controlled to connect the first and second output ends 118 and 120 to the first and second protection voltages $V_{p1}$ and $V_{p2}$). Of course, the first protection voltage $V_{p1}$ can be equal to the second protection voltage $V_{p2}$ that is, wells of each of the PMOS transistors of the level shift circuit 88 connected to an identical protection voltage. Alternatively, protection voltages connected to wells of the PMOS transistors of the level shift circuit 88 can have different levels from each other.

Operations of the regulated charge pump 80 are described as follows. Initially, a voltage at the output end 110 of the negative charge pump 82 is equal to zero volts, and in the meantime the detection circuit 114 of the protection circuit 90 controls the switch 112 to connect both the first and second output ends 118 and 120 to the first normal voltage $V_{r1}$, connecting wells of each of the PMOS transistors of the level shift circuit 88 to the first normal voltage $V_{r1}$. As the voltage at the output end 110 of the negative charge pump 82 is pumped lower, a voltage at the first drain 98 of the first PMOS transistor 92 of the level shift circuit 88 becomes lower accordingly. Since at this moment a voltage at the positive input end 100 (connected to the first drain 98 of the first PMOS transistor 92) of the differential amplifier 86 is still higher than the second reference $V_{ref2}$, the differential amplifier 86 continues to output the compare signal, the oscillator 84 outputs the oscillation signal accordingly, and the negative charge pump 82 continues to negatively pump the voltage at the output end 110. When the voltage at the output end 110 of the negative charge pump 82 is pumped to a voltage lower than the first threshold $V_{th1}$, the detection circuit 114 of the protection circuit 90 controls the switch 112 to connect the first and second output ends 118 and 120 to the first and second protection voltages $V_{p1}$ and $V_{p2}$ respectively to protect the plurality of PMOS transistors from breaking down. When the voltage at the output end 110 of the negative charge pump 82 is further pumped to a voltage capable of enabling a voltage at the first drain 98 of the first PMOS transistor 92 to be lower than the second threshold $V_{th2}$, a voltage at the positive input end 100 of the differential amplifier 86 becomes lower than the second reference voltage $V_{ref2}$. The differential amplifier 86 then stops outputting the compare signal, the oscillator 84 stops outputting the oscillation signal, and the negative charge pump 82 also stops negatively pumping the voltage at the output end 110.

The regulated charge pump 80 shown in FIG. 3 is for generating a negative voltage. Please refer to FIG. 5, which is a circuit diagram of a second embodiment of a regulated charge pump 130 according to the present invention. The regulated charge pump 130 is for generating a positive voltage. The regulated charge pump 130 comprises a positive charge pump 132 for generating a second output voltage by determining an oscillation signal, the oscillator 84 being connected to the charge pump 132 for generating the oscillation signal by determining a compare signal. The differential amplifier 86 is connected to the oscillator 84, and a level shift circuit 138 is connected between the charge pump 132 and the differential amplifier 86 and a protection circuit 140. The level shift circuit 138 comprises a plurality of serially connected NMOS transistors. The protection circuit 140 comprises an input end 166 connected to an output end 160 of the charge pump 132, a first input end 168 connected to a first well 172 of a first NMOS transistor 142 of the level shift circuit 138, and a second input end 170 connected to wells of the remaining NMOS transistors of the level shift circuit 138.

Figure 5:
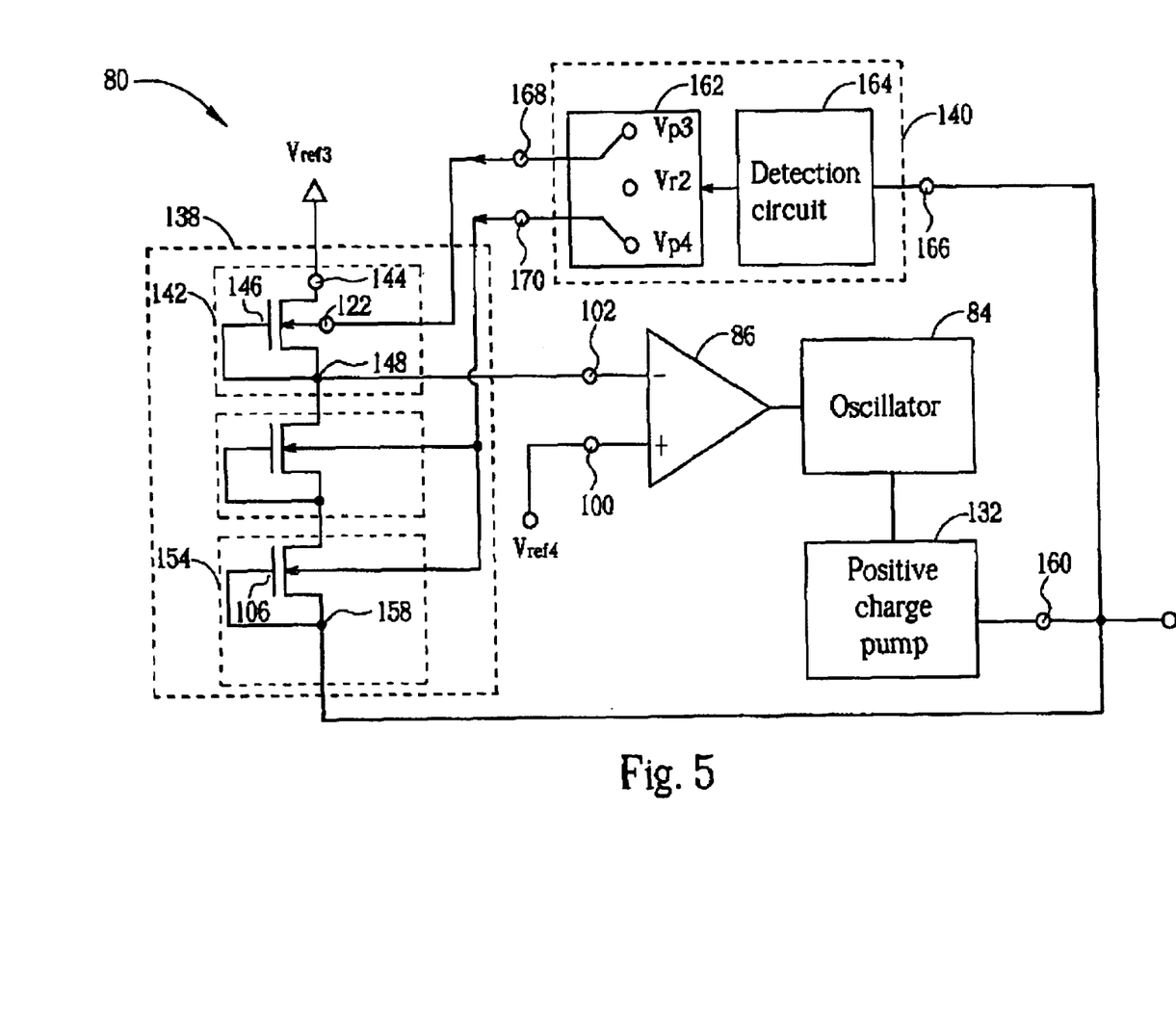
FIG. 5 is a circuit diagram of a second regulated charge pump according to the present invention.

The first NMOS transistor 142 comprises a first source 144 connected to a third reference voltage $V_{ref3}$, a first gate 146 and a first drain 148, both of which are connected to the negative input end 102 of the differential amplifier 86. A second NMOS transistor 154 of the level shift circuit 138 has a second gate 156 and a second drain 158, both of which are connected to the output end 160 of the charge pump 132. The positive input end 100 of the differential amplifier 86 is connected to a fourth reference voltage $V_{ref4}$.

The protection circuit 140 comprises a switch 162 and a detection circuit 164. The detection circuit 164 controls the switch 162 to connect the first output end 168 either to a third protection voltage $V_{p3}$ or to a second normal voltage $V_{r2}$ and to connect the second output end 170 either to a fourth protection voltage $V_{p4}$ or to the second normal voltage $V_{r2}$ by determining whether or not a voltage at the output end 110 of the charge pump 132 is higher than a second threshold voltage $V_{th2}$. That is, when a voltage at the output end 160 of the charge pump 132 is still lower than the second threshold voltage $V_{th2}$, the detection circuit 164 detects this and controls the switch 162 to connect both the first and second output ends 168 and 170 to the second normal voltage $V_{r2}$. On the contrary, when a voltage at the output end 160 of the charge pump 132 is higher than the second threshold voltage $V_{th2}$, the detection circuit 164 controls the switch 162 to connect the first and second output ends 168 and 170 to the third and fourth protection voltages $V_{p3}$ and $V_{p4}$ respectively. In the second embodiment, the second normal voltage $V_{r2}$ is lower than the third protection voltage $V_{p3}$, which is lower than the fourth protection voltage $V_{p4}$.

Since operations of the regulated charge pump 130 are similar to those of the regulated charge pump 80, further descriptions are omitted.

In contrast to the prior art, the present invention can provide a regulated charge pump comprising a level shift circuit composed of a plurality of MOS transistors, occupying a small amount of space in an integrated circuit. In addition, the present invention regulated charge pump further comprises a protection circuit capable of adjusting a reverse bias voltage across a drain and a well of a MOS transistor of the level shift circuit by determining whether or not a voltage at the output end of the negative (or positive) charge pump is lower than a threshold voltage to protect the PMOS from breaking down.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A regulated charge pump comprising:
   a negative charge pump for generating a first output voltage by determining an oscillation signal;
   a regulator for restricting a swing of the first output voltage, the regulator comprising:
   a level shift circuit connected to the negative charge pump for generating a second output voltage at an output end of the level shift circuit by determining the first output voltage generated by the negative charge pump, the level shift circuit comprising:
   a plurality of serially connected PMOS transistors, a first source of a first PMOS transistor of the PMOS transistors connected to a first reference voltage source, a first gate and a first drain of the first PMOS transistor connected to the output end of the level shift circuit, and a second gate and a second drain of a second PMOS transistor of the PMOS transistors connected to the output end of the negative charge pump;
   a differential amplifier, whose first and second input ends are connected to a second reference voltage source and the output end of the level shift circuit respectively, for generating a compare signal by determining a voltage difference between the second output voltage and a voltage generated by the second voltage source; and a voltage-controlled oscillator connected between an output end of the differential amplifier and an input end of the negative charge pump; and a protection circuit, whose input end and output end are connected to the output end of the negative charge pump and wells of the PMOS transistors respectively, for generating a first protection voltage at the output end of the protection circuit by determining the first output voltage.

2. The regulated charge pump of claim 1, wherein the second voltage source is ground.

3. The regulated charge pump of claim 1, wherein the protection circuit comprises:

a switch, whose first and second ends are connected to the output end of the protection circuit and the first protection voltage respectively; and a voltage detection circuit connected to the switch and to the output end of the negative charge pump for controlling the switch by determining the first output voltage.

4. The regulated charge pump of claim 3, wherein when the voltage detection circuit detects that the first output voltage is lower than a threshold voltage, the switch is closed and transmits the first protection voltage to the wells of the PMOS transistors.

5. A regulated charge pump comprising:

a positive charge pump for generating a first output voltage by determining an oscillation signal;

a regulator for restricting a swing of the first output voltage, the regulator comprising:

a level shift circuit connected to the positive charge pump for generating a second output voltage at an output end of the level shift circuit by determining the first output voltage generated by the positive charge pump, the level shift circuit comprising:

a plurality of serially connected NMOS transistors, a first source of a first NMOS transistor of the NMOS transistors connected to a first reference voltage source, a first gate and a first drain of the first NMOS transistor connected to the output end of the level shift circuit, and a second gate and a second drain of a second NMOS transistor of the NMOS transistors connected to the output end of the positive charge pump;

a differential amplifier, whose first and second input ends are connected to a second reference voltage source and the output end of the level shift circuit respectively, for generating a compare signal by determining a voltage difference between the second output voltage and a voltage generated by the second voltage source; and a voltage-controlled oscillator connected between an output end of the differential amplifier and an input end of the positive charge pump; and a protection circuit, whose input end and output end are connected to the output end of the positive charge pump and wells of the NMOS transistors respectively, for generating a first protection voltage at the output end of the protection circuit by determining the first output voltage.

6. The regulated charge pump of claim 5, wherein the second voltage source is ground.

7. The regulated charge pump of claim 5, wherein the protection circuit comprises:

a switch, whose first and second ends are connected to the output end of the protection circuit and the first protection voltage respectively; and a voltage detection circuit connected to the switch and to the output end of the positive charge pump for controlling the switch by determining the first output voltage.

8. The regulated charge pump of claim 7, wherein when the voltage detection circuit detects that the first output voltage is higher than a threshold voltage, the switch is closed and transmits the first protection voltage to the wells of the NMOS transistors.

9. A regulated charge pump comprising:

a negative charge pump for generating a first output voltage by determining an oscillation signal;

a regulator for restricting a swing of the first output voltage, the regulator comprising:

a level shift circuit connected to the negative charge pump for generating a second output voltage at an output end of the level shift circuit by determining the first output voltage generated by the negative charge pump, the level shift circuit comprising:

a plurality of serially connected PMOS transistors, a first source of a first PMOS transistor of the PMOS transistors connected to a first reference voltage source, a first pate and a first drain of the first PMOS transistor connected to the output end of the level shift circuit, and a second gate and a second drain of a second PMOS transistor of the PMOS transistors connected to the output end of the negative charge pump;

a differential amplifier, whose first and second input ends are connected to a second reference voltage source and the output end of the level shift circuit respectively, for generating a compare signal by determining a voltage difference between the second output voltage and a voltage generated by the second voltage source; and a voltage-controlled oscillator connected between an output end of the differential amplifier and an input end of the negative charge pump; and a protection circuit, whose input end, first, and second output ends are connected to the output end of the negative charge pump, a first well of the first PMOS transistor, and wells of remaining PMOS transistors respectively, for generating first and second protection voltages at first and second output ends of the protection circuit respectively by determining the first output voltage.

10. The regulated charge pump of claim 9, wherein the second voltage source is ground.

11. The regulated charge pump of claim 9, wherein the first protection voltage is higher than the second protection voltage.

12. The regulated charge pump of claim 9, wherein the protection circuit comprises:

a switch, whose first, second, third, and fourth ends are connected to a first output end of the protection circuit, the first protection voltage, a second output end of the protection circuit, and the second protection voltage respectively; and a voltage detection circuit connected to the switch and to the output end of the negative charge pump for controlling the switch by determining the first output voltage.

13. The regulated charge pump of claim 12, wherein when the voltage detection circuit detects that the first output voltage is lower than a threshold voltage, the switch is closed and transmits the first and second protection voltages to the first well of the first PMOS transistor and the wells of the remaining PMOS transistors respectively.

14. A regulated charge pump comprising:
   a positive charge pump for generating a first output voltage by determining an oscillation signal;
   a regulator for restricting a swing of the first output voltage, the regulator comprising:
      a level shift circuit connected to the positive charge pump for generating a second output voltage at an output end of the level shift circuit by determining the first output voltage generated by the positive charge pump, the level shift circuit comprising:
         a plurality of serially connected NMOS transistors, a first source of a first NMOS transistor of the NMOS transistors connected to a first reference voltage source, a first gate and a first drain of the first NMOS transistor connected to the output end of the level shift circuit, and a second gate and a second drain of a second NMOS transistor of the NMOS transistors connected to the output end of the positive charge pump;
      a differential amplifier, whose first and second input ends are connected to a second reference voltage source and the output end of the level shift circuit respectively, for generating a compare signal by determining a voltage difference between the second output voltage and a voltage generated by the second voltage source; and
      a voltage-controlled oscillator connected between an output end of the differential amplifier and an input end of the positive charge pump; and
   a protection circuit, whose input end, first, and second output ends are connected to the output end of the positive charge pump, a first well of the first NMOS, and wells of remaining NMOS transistors respectively, for generating first and second protection voltages at first and second output ends of the protection circuit respectively by determining the first output voltage.

15. The regulated charge pump of claim 14, wherein the second voltage source is ground.

16. The regulated charge pump of claim 14, wherein the first protection voltage is lower than the second protection voltage.

17. The regulated charge pump of claim 14, wherein the protection circuit comprises:
   a switch, whose first, second, third, and fourth ends are connected to a first output end of the protection circuit, the first protection voltage, a second output end of the protection circuit, and the second protection voltage respectively; and
   a voltage detection circuit connected to the switch and to the output end of the positive charge pump for controlling the switch by determining the first output voltage.

18. The regulated charge pump of claim 17, wherein when the voltage detection circuit detects that the first output voltage is higher than a threshold voltage, the switch is closed and transmits the first and second protection voltages to the first well, of the first NMOS transistor and the wells of the remaining NMOS transistors respectively.

* * * * *